Sept. 7, 1965 D. R. LUDWIG 3,205,443

INTERFERING SIGNAL RESOLVING SYSTEM

Filed June 26, 1961 3 Sheets-Sheet 1

INVENTOR.
DAVID R. LUDWIG
BY Walter J Kreske

INTERFERING SIGNAL RESOLVING SYSTEM

Filed June 26, 1961 3 Sheets-Sheet 2

INVENTOR.
DAVID R. LUDWIG
BY Walter J. Kreske

INTERFERING SIGNAL RESOLVING SYSTEM

Filed June 26, 1961 3 Sheets-Sheet 3

INVENTOR.
DAVID R. LUDWIG

BY Walter J. Kreske

United States Patent Office 3,205,443
Patented Sept. 7, 1965

3,205,443

INTERFERING SIGNAL RESOLVING SYSTEM

David R. Ludwig, Randolph, Mass., assignor to General Electronic Laboratories, Inc., Cambridge, Mass., a corporation of Massachusetts Filed June 26, 1961, Ser. No. 126,456
10 Claims. (Cl. 325—344)

This invention relates to systems for resolving two or more radio frequency signals existing in the same or adjacent portions of the frequency spectrum, and more particularly to signal resolving systems utilizing narrow band attenuating filters arranged to track a selected one of the radio frequency signals.

Under existing high congestion conditions of assigned communications channel space and under conditions of intentional military jamming, an acute problem exists in extracting desired information signals with existing receivers. Conventional frequency modulation receivers have a natural capability for suppressing the weaker of two incoming interfering signals because of the inherent capture affect at the receiver limiter. Capture affect as herein used is the property of changing the intensity ratio of two interfering signals so as to accentuate the stronger of the two signals. However, because of this capture affect, the conventional modulation receiver is incapable of extracting the weaker of the two interfering signals and is therefore useless where the weaker of the two interfering signals is the desired signal.

Frequency modulation receiver modifications which have attempted to extract the weaker of two incoming interfering signals have been particularly unsuccessful in the case where the interfering signals have overlapping frequency excursions.

These problems are overcome in the present invention of an interfering signal resolving system which utilizes an attenuating filter arranged to track the stronger signal and which also incorporates other desirable features and advantages.

Among these other desirable features and advantages is an interfering signal resolving system which is compatible with and directly adaptable to existing frequency modulation receivers. Another advantage is that the present invention can be made to operate equally well where the interfering signal is of the same phase modulated variety. A further advantage is that the present interfering signal resolving system will operate with amplitude modulation pulse information signals as the weaker signal where the presence of pulses or spacing of pulses carries the desired information.

Other advantages are that the present interfering signal resolving system is relatively inexpensive, relatively simple for adaptation to existing receivers, reliable in its operation and is effective in even wide ranges of intensity difference between the interfering signals and its operation depends only upon the relative difference in intensity of the two signals and not upon the absolute values of their intensities. Also, a change in the relative intensities of the two interfering signals does not require adjustment of any kind within the system itself for intelligible output. Additionally, the present system is applicable for the attenuation of signals which interfere from adjacent channels, as well as signals which appear simultaneously within the same pass-band.

Furthermore, the present interfering signal resolving system is adaptable to placement in tandem with itself for operation with three or more interfering signals and is readily adaptable for resolving both the stronger and weaker interfering signals for extraction of their respective intelligence.

A further advantage is that the present system is operable for obtaining the information in the weaker signal, even where the intensity differential between two interfering signals is small, less than 1 db. Also the present system will allow reception of the weaker signal even in the presence of continuous wave signals which change at any rate of frequency or in the presence of intermittent interfering signals, or where the desired signal itself is intermittent. Additionally, when the average frequency of either of the interfering signals changes, the system continues to operate properly, requiring no additional adjustment. And a further advantage of the present interfering signal resolving system is that when incorporated in an existing frequency modulation receiver, it in no way detracts from the normal sensitivity of the receiver for operation with a single signal and will even receive the weaker of two interfering incoming signals with the same degree of sensitivity that it would have received the weaker if the weaker were the only signal appearing at the receiver.

These objects, features and advantages are achieved generally by providing a frequency modulation receiver having an intermediate frequency amplifier, a voltage controlled tracking attenuator, guidance circuitry coupled to the intermediate frequency amplifier and the tracking attenuator for providing control voltage thereto, radio frequency delay means interposed in the signal path of the intermediate frequency amplifier and the tracking attenuator for time delay of information signals to compensate for those passing the guidance circuitry, and a demodulator coupled to the output of the tracking attenuator for extracting the modulation information of the signal from the tracking attenuator.

By making the guidance circuitry in the form of a demodulator and compensating amplifier, modulation voltage of the stronger signal from the intermediate frequency amplifier is thereby used for linear frequency control of the tracking attenuator.

By providing a pair of channels with a wide band amplifier in one of the channels and a voltage tunable narrow band amplifier in the other channel with the output of both channels in subtracting relationship, a suitable tracking attenuator for use in the present invention is thereby achieved.

By making the narrow band amplifier in the form of a varactor tuned tank circuit, a voltage tunable reactance structure with a desirably high Q is thereby achieved.

By making a compensating amplifier with an output voltage response characteristic being the complement of the voltage characteristic of the varactor in the tracking attenuator, suitable linear voltage tracking response of the variable narrow band attenuator is thereby achieved.

By providing an intermediate frequency delay means in the form of a quartz type delay line, a suitable, compact, small, reliable time delay device with a uniform time delay over a very wide frequency band for matching the guidance delay signal in the guidance circuitry is thereby achieved.

These objects, features and advantages will be better understood from the following description taken in connection with the accompanying drawings of preferred embodiments of the invention and wherein.

Figures 1, 2:
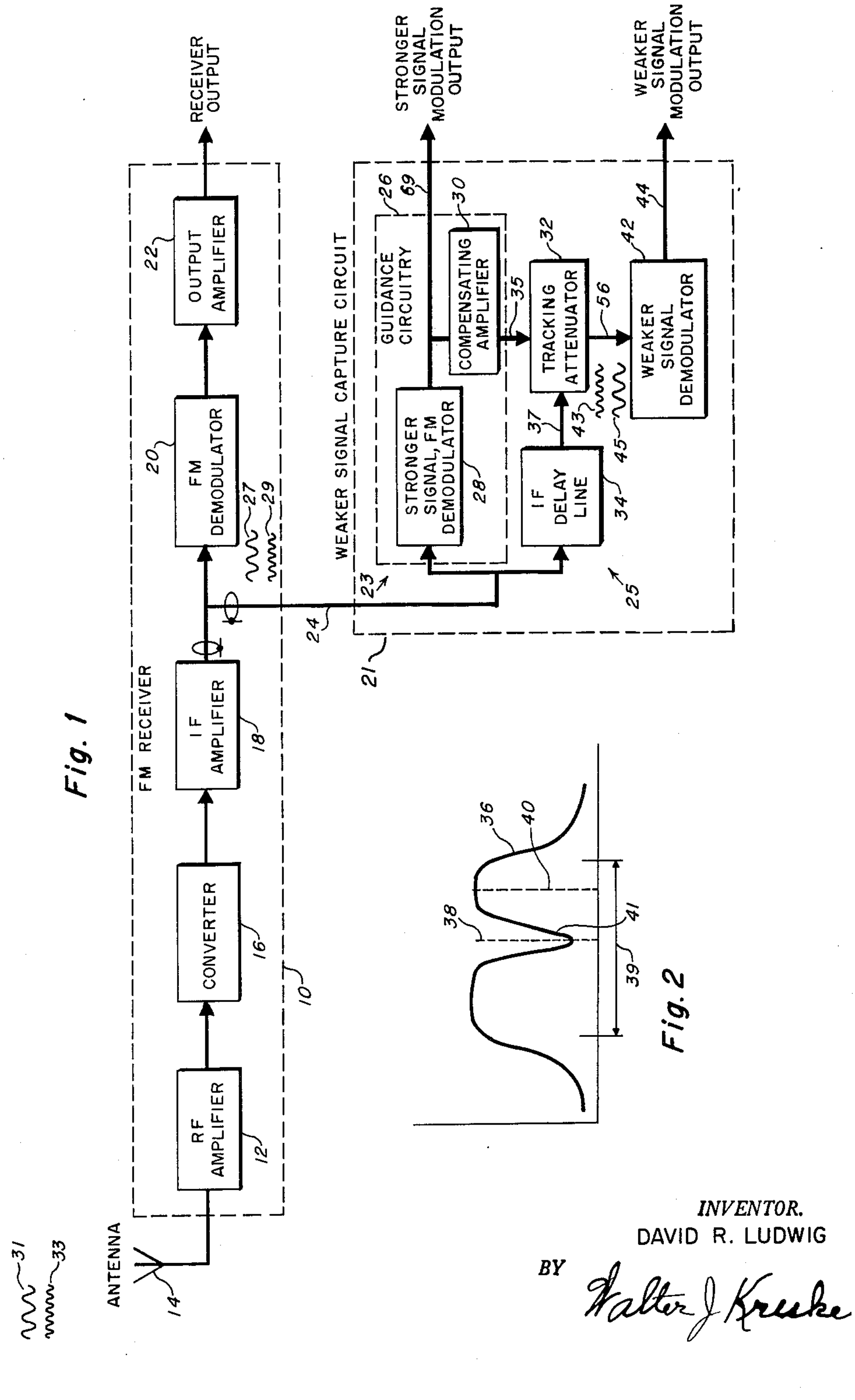
FIG. 1 is a block diagram of a frequency modulation receiver constructed and adapted to operate in accordance with the present invention.
FIG. 2 is a graph illustrating amplitude response as a function of frequency of the tracking attenuator shown in block form in FIG. 1.

Referring to FIG. 1 in more detail, a conventional frequency modulation receiver designated by the broken lines 10, includes a radio frequency amplifier 12, to the input of which is coupled an antenna 14, and the output of which is coupled to a conventional frequency converter 16. The converter 16 feeds an intermediate frequency amplifier 18, the output of which appears at a frequency modulation demodulator 20 having an output fed through an output amplifier 22 to a suitable use device such as a loudspeaker for audio signals or an information processing unit for video signals.

The output of the intermediate frequency amplifier 18 is also fed through a line such as coaxial cable 24 to a weaker signal capture circuit 21 comprised of two channels 23 and 25. One of the channels 23 is comprised of guidance circuitry 26 including a conventional frequency modulation demodulator 28 for demodulating the stronger intermediate frequency signal 27 of two interfering intermediate frequency signals 27 and 29 from the output of the IF amplifier 18 and which correspond to the interfering radio frequency signals 31 and 33 respectively at the antenna 14. The demodulator 28 output is fed to a voltage compensating amplifier 30 for producing thereby a tracking control voltage through a line 35 to a tracking attenuator 32. The characteristics of the compensating amplifier 30 and tracking attenuator 32 will be hereinafter further described.

The other channel 25 includes a delay line 34 such as a quartz crystal type delay device for delaying the interfering signals 27 and 29 from the intermediate frequency amplifier 18 an amount which is substantially the same as that of the delay caused in the guidance circuitry 26. The delay line 34 has its output coupled through a line 37 to the tracking attenuator 32. The tracking attenuator 32 has an output line 56 and an operating characteristic shown in FIG. 2 which consists of a broad passband 39 with a narrow band attenuating notch 41 having a center frequency 38 which is movable and controlled by the tracking control voltage signal appearing through line 35 from the guidance circuitry 26.

The values are such that the delay line 34 has a time delay wherein the stronger signal 27 appearing through line 37 at the tracking attenuator 32 has an instantaneous frequency the same as the instantaneous frequency 38 in the attenuating notch 41 of the tracking attenuator 32 as determined by the tracking control voltage signal appearing through line 35.

Therefore, the interfering signals 27 and 29 appearing through the delay line 34 and line 37 at the tracking attenuator 32, being within the broad pass band 39, pass through to the output line 56, except for the portion attenuated by appearing at the attenuation dip 41. Since the tracking control voltage signal in line 35 is such that the instantaneous frequency of the stronger signal 27 coincides with the instantaneous attenuation frequency 38 there is produced at the output of the tracking attenuator 32 a weaker signal 43 and a stronger signal 45 which are the same signals 27 and 29 respectively, except in that their intensities are reversed so that the signal 27 which has heretofore been the stronger signal is now the weaker signal 43 and the signal 29 which has heretofore been the weaker signal is now the stronger signal 45. These output signals 43 and 45 appear through the line 56 at the weaker signal demodulator 42 where the modulation information in the signal 45 is extracted and appears through the output line 44 as the weaker signal 29 modulation output.

Figures 3, 4:
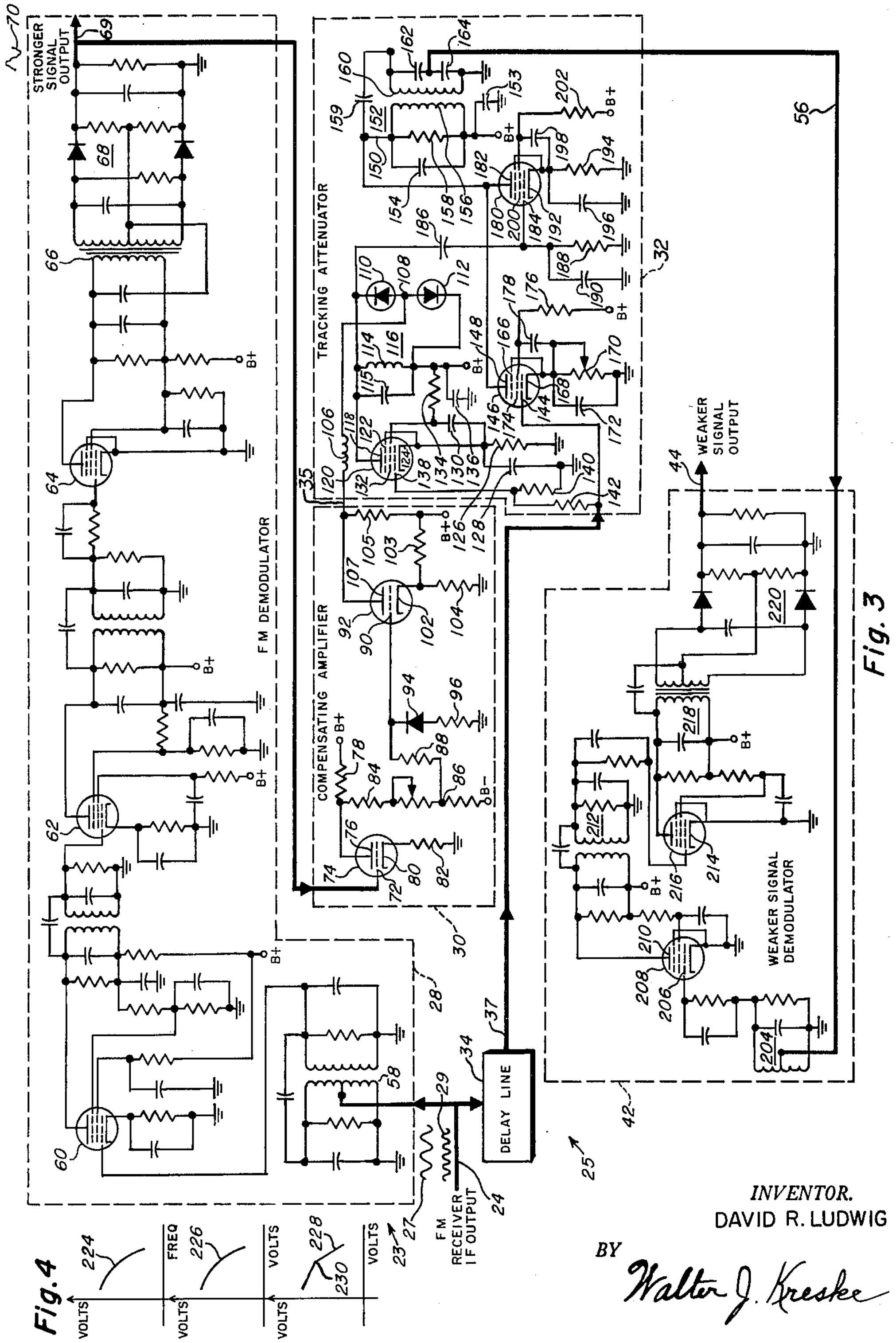
FIG. 3 is a schematic diagram of a portion of the illustration shown in block form in FIG. 1.
FIG. 4 is a graph for more clearly illustrating operation of the invention.

Referring to FIG. 3 in more detail, there is shown a schematic diagram of a preferred embodiment of the weaker signal capture circuit 21 shown in block form in FIG. 1. The FIG. 3 embodiment includes the two signal channels 23 and 25. The channel 23 includes a conventional frequency modulation demodulator 28 in which the input of interfering signals 27 and 29 from the intermediate frequency amplifier 18 are fed through line 24 to the center tap of an input signal transformer 58, the output of which is fed to the control grid of a first stage 60 of three tandem coupled conventional frequency amplitude limiter stages, the other two stages of which are 62 and 64. The output from the limiter stage 64 is fed through an output discriminator transformer 66 and conventional full wave detector 68 to the output line 69 which carries the demodulated information signal 70 which is the modulation information on the stronger signal 27.

This output signal 70 is fed through line 69 to a control grid 72 of an amplifier stage 74 in the compensating amplifier 30. The amplifier stage 74 has an anode 76 coupled through a plate resistor 78 to B+ and a cathode 80 coupled through a resistor 82 to ground. The plate 76 is also coupled through a voltage divider chain 84 to B—. The output voltage variations from the plate 76 are taken from the divider chain 84 at point 86 and fed through resistor 88 to control grid 90 of a second amplifier stage 92 in the compensating amplifier circuit 30. The point 86 is also coupled through resistor 88 and rectifier 94 and resistor 96 to ground to provide thereby a non-linear compensation for negative biasing voltages to be hereinafter further described.

The amplifier stage 92 has a cathode 102 which is biased by resistor 103 coupled to B+ and resistor 104 coupled to ground. B+ is also coupled through plate load resistor 105 to the plate 107 of the amplifier stage 92. Plate 107 is also coupled through line 35 and an inductor 106 to a point 108 between a pair of back-to-back varactors 110 and 112.

Varactors 110 and 112 are coupled across an inductor 14 and capacitor 115 to form a high Q tank circuit 116 whose tuned frequency is determined by the voltage 108. The high Q tank circuit 116 also provides the plate load for plate 118 to which it is coupled and for which it provides a high Q, narrow band amplifier stage 120 in the tracking attenuator 32. The amplifier stage 120 has a suppressor grid 122 coupled back to a cathode 124 which is coupled through a biasing resistor 126 to ground and through a bypass capacitor 128 to ground and through another bypass capacitor 130 to a screen grid 132. The screen grid 132 is also coupled through a resistor 134 to B+ and through a bypass capacitor 136 to ground. B+ is also tied to one side of the high Q tank circuit 116.

Capacitor 130, resistors 134 and 126 and capacitor 128 have as their primary function that of providing normal operating bias to the screen grid 132 and a control grid 138 in the amplifier stage 120. The control grid 138 is coupled through a resistor 140 to ground and through a resistor 142 to the output line 37 from the quartz delay line 34. The line 37 is also coupled to a control grid 144 of an amplifier stage 146 of a wideband amplifier having a plate 148 coupled to primary side 150 of a double tuned circuit 152, the other side of which is coupled to B+ and through a capacitor 153 to ground. The primary side of the double tuned circuit 152 has a capacitor 154, inductor 156 and resistor 158 all of which are in parallel and all of which are coupled at the end 150 through a capacitor 159 to the secondary side of the double tuned circuit 152 and which has an inductor 160 and series capacitors 162 and 164 in parallel across the inductor 160. The output of the double tuned circuit 152 appears through line 56 which is coupled to a point between the capacitors 162 and 164.

The amplifier stage 146 has a suppressor grid 166 tied back to a cathode 168 which is coupled through a resistor 170 and capacitor 172 to ground. The amplifier stage 146 has a screen grid 174 coupled through a resistor 176 to B+ and bypass capacitor 178 to resistor 170. Resistor 170, capacitor 172, capacitor 178 and resistor 176 have the primary purpose of providing proper bias to screen grid 174 and cathode 168.

A phase inverter and isolation amplifier stage 180 has a plate 182 coupled to the side 150 of the double tuned circuit 152 which also provides the plate load circuit thereto. The inverter and isolation amplifier stage 180 has also a control grid 184 coupled through a coupling capacitor 186 to the plate 118 of the high Q narrow band amplifier stage 120 and through parallel resistor 188 and capacitor 190 to ground.

The inverter and isolation amplifier stage 180 also has a cathode 192 coupled through a resistor 194 and a capacitor 196 in parallel to ground and through a bypass capacitor 198 to a screen grid 200 which is also coupled through a resistor 202 to B+.

The output line 56 from the double tuned tank circuit 152 is coupled to a centertap of a single tuned circuit 204 feeding a control grid 206 of the first stage 208 of a conventional frequency modulation limiter circuit. The stage 208 has a plate 210 coupled to a conventional double tuned capacitive coupled tank circuit 212 whose output is coupled to a control grid 214 of a second pentode amplitude limiter stage 216 which feeds a conventional frequency modulation discriminator circuit 218. The discriminator circuit 218 is coupled to a conventional full wave detector circuit 220. The output of the full wave detector circuit 220 appears in line 44 as the demodulated weaker signal 29 output.

In the operation of the weaker signal capture circuit 21 shown in FIG. 3, the stronger and weaker signals 27 and 29 respectively from the intermediate frequency amplifier 18 are fed through line 24 simultaneously to channels 23 and 25. In the channel 25, the stronger and weaker signals 27 and 29 appear through the quartz delay line 34 and through line 37 to the control grid 144 of the broad band amplifier stage 146 and simultaneously through attenuating resistors 142 and 140 to the control grid 138 of the narrow band amplifier stage 120. The output from the narrow band amplifier stage 120 is fed from plate 118 through coupling capacitor 186 to the control grid 184 of the inverter amplifier stage 180. The output of the inverter amplifier stage 180 and the output of the broad band amplifier stage 146 are summed in the double tuned tank circuit 152. This summation output of the broadband amplifier stage 146 and of the narrow band amplifier stage 120 as inverted by the inversion stage 180 appears in the output line 56 and has the bandpass characteristics shown by the curve 36 in FIG. 2.

Simultaneously with the passage of the interfering signals 27 and 29 through the quartz delay line 34, the same signals will also appear in channel 23 at the frequency modulation demodulator 28 where due to the natural capture affect of the limiters 60, 62 and 64 the stronger signal 27 will be demodulated and its modulation information will appear as the output signal 70 in line 69, which signal 70 will also appear at the control grid 72 of the first compensating amplifier stage 74. The output of the first compensating amplifier stage 74 is fed from the plate 76 to the grid 90 of the second compensating amplifier stage 92, the output of the amplifier stage 92 is fed from the plate 107 through inductor 106 to control point 108 between the back-to-back varactors 110 and 112 as a control tracking voltage altering the resonant frequency of the tank circuit 116 in accordance with the voltage appearing at point 108 so as to define the center frequency 38 FIG. 2 in the narrow band tank circuit 116. For proper tracking, it is essential that the tracking frequency 38 of the narrow band circuit 116 vary linearly with the discriminator 68 output voltage in line 69.

Inasmuch as the voltage tuning characteristic of narrow band tank circuit 116, due to the back-to-back varactors 110 and 112, is non linear as represented by curve 224 in FIG. 4, the compensation amplifier circuit 26 is arranged to provide a complementary voltage output response to voltage input as appears at curve 226 in FIG. 4 to thereby operate upon input control tracking voltage 70 so as to have the affect in tank circuit 116 of a linear response with respect to the input control tracking voltage 70. This complementary output of the compensating amplifier circuit 26 is accomplished by resistor 96, rectifier 94, and resistor 88 which provide a piece-wise linear approximation to curve 226 and is shown as curve 228 in FIG. 4. For positive voltages at point 86, the rectifier 94 is open circuited so that positive voltages appear directly at the control grid 90 of the second amplifier stage 92 in the compensating amplifier 26.

For negative voltages at point 86, the rectifier 94 is conductive, thus resistors 88 and 96 attenuate the voltage from point 86, resulting in less output gain for negative voltages than for positive voltages, to thereby provide the curve 228 which has a break-point 230 corresponding to zero grid voltage at the control grid 90.

Figure 5:
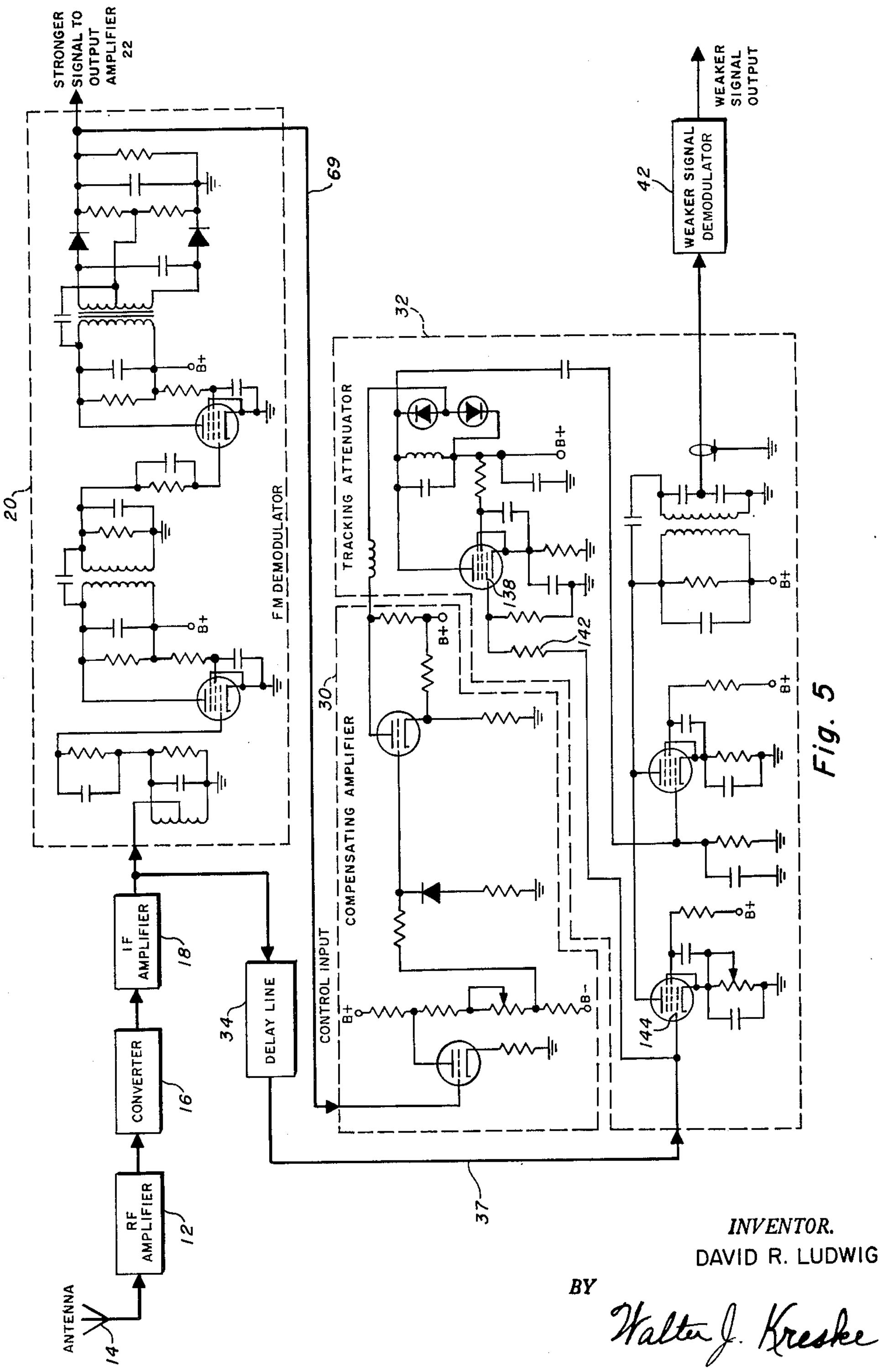
FIG. 5 is a partially block and partially schematic diagram illustrating an alternative embodiment of the present invention.

Referring more particularly to FIG. 5, a partially block and partially schematic diagram is shown therein of an alternative embodiment of the present invention wherein the frequency modulation demodulator 20 of a normal frequency modulation receiver itself is used for providing the control tracking signal source.

In the alternative embodiment in FIG. 5, many of the structures used in the FIGS. 1 and 3 embodiment are likewise applicable to the alternative embodiment. For example, the antenna 14, radio frequency amplifier 12, converter 15, intermediate frequency amplifier 18, may all be identical to those used and described in connection with the FIGS. 1 and 3 embodiment. Also the demodulator 42 is suitable for use as the demodulator 20 in the receiver. Likewise, the output of the intermediate frequency amplifier 18 is coupled through the quartz delay line 34 to control grid 144 and through attenuating resistor 142 to grid 138 in the tracking attenuator 32. The tracking attenuator 32 is of identical construction and operation as that described in connection with FIG. 3. The control signal is in this instance fed through line 69 from the output of the demodulator 20 in similar manner to that previously described in connection with the demodulator 28 in FIG. 3. In this instance the demodulator 20 is identical in construction and operation to that described in connection with demodulator 42 in FIG. 3, except that the demodulator 42 is connected into the receiver and designated demodulator 20 shown in broken lines in FIG. 5 thereby eliminating the need for a second demodulator such as 28 in FIG. 3 for providing the control signal.

This invention is not limited to the particular details of construction and operation described as equivalents will suggest themselves to those skilled in the art.

What is claimed is:

1. A frequency modulation receiver comprising an intermediate frequency amplifier, a tracking attenuator for attenuating signals of a frequency determined by the intensity of a tracking control voltage, demodulator means with an input coupled to the intermediate frequency amplifier and output coupled to the tracking attenuator for supplying said tracking control voltage, and means coupled to the intermediate frequency amplifier for supplying the signals from said intermediate frequency amplifier to the tracking attenuator.

2. A frequency modulation receiver comprising an intermediate frequency amplifier having an output signal path, a voltage controlled tracking attenuator in the output signal path, guidance voltage circuitry coupled to the intermediate frequency amplifier and the tracking attenuator for providing the control voltage to the tracking attenuator, signal delay means interposed in the output signal path of the intermediate frequency amplifier to the tracking attenuator, and a signal demodulator coupled in responsive relation to the signal output of the tracking attenuator.

3. The combination as in claim 2 wherein the guidance circuitry includes a demodulator and a compensating amplifier for effecting a linear tracking response to demodulation voltage signals.

4. The combination as in claim 2 wherein the tracking attenuator includes a wideband and a narrow band amplifier in subtracting relation to each other and the narrow band amplifier is voltage tunable by said control voltage.

5. The combination as in claim 2 wherein the tracking attenuator includes a narrow band amplifier in the form of a varactor tuned tank circuit coupled in responsive relation to the control voltage.

6. The combination as in claim 2 wherein the tracking attenuator includes a narrow band amplifier in the form of a varactor tuned tank circuit coupled in responsive relation to the control voltage and the guidance voltage circuitry includes a compensating amplifier supplying said control voltage and having a response characteristic which is substantially the complement of the voltage characteristic of the varactor circuit to thereby effect a substantially linear voltage tracking response in the narrow band amplifier.

7. The combination as in claim 2 wherein the signal delay means is a quartz type delay device having a signal time delay value substantially that of the guidance voltage circuitry.

8. In combination, a frequency modulation information signal source, a pair of signal traversing channels coupled to said source, a narrow band attenuator for attenuating signals of a frequency determined by the intensity of a control voltage applied to the attenuator, demodulator means in one of the channels in responsive relation to the signal source for providing said control voltage, and signal delay means in the other channel and arranged for supplying the signals from the source to the attenuator delayed in time an amount substantially matching that of the delay in the first channel.

9. In combination, means for receiving a pair of frequency modulation signals of different intensities in the same frequency band, a filter having a tank circuit carrying a varactor and which is tunable by variation of voltage to the varactor, a broadband filter, said varactor tunable filter and said broadband filter including output means coupled together in manner to cause subtraction of the output of said varactor tunable filter from the output of said broadband filter, demodulator means coupled to the receiving means for extracting the demodulated information signal from the stronger of said pair, means coupled to the demodulator means and varactor tunably filter for applying said demodulated signal as the tuning voltage to said varactor tunable filter for selectively tuning the varactor tunable filter to the stronger signal frequency, means for applying said signal pair to the filters, and a second demodulator means arranged for demodulating the subtracted filter output.

10. A voltage tunable filter comprising an amplifying current valve having a control grid for receiving frequency modulation information signals and a plate output circuit, parallel coupled capacitive and inductive elements forming an oscillatory combination in the plate circuit, the capacitive elements including back-to-back series coupled varactors in parallel with the oscillatory combination, a voltage signal means connected to the series coupling between the back-to-back varactors for supplying variable tuning to the oscillatory combination, a broad band amplifier means arranged for receiving said frequency modulation information signals and having an output circuit for said frequency modulation information signals, and means coupling the output circuits of said broadband amplifier means and said voltage tunable filter in voltage subtracting relation to each other to thereby provide a variable attenuation notched filter.

References Cited by the Examiner

UNITED STATES PATENTS

| | | | |
|---|---|---|---|
| 2,386,528 | 10/45 | Wilmotte | 325—344 |
| 2,388,200 | 10/45 | Wilmotte | 325—344 |
| 2,426,187 | 8/47 | Earp | 325—321 |
| 2,609,493 | 9/52 | Wilmotte | 325—344 |
| 2,947,859 | 8/60 | McDonald | 325—427 |
| 3,003,117 | 10/61 | Stavis | 324—77 |
| 3,067,394 | 12/62 | Zimmerman | 333—17 |
| 3,110,004 | 11/63 | Pope | 333—76 |

OTHER REFERENCES

Electrical Manufacturing, December 1954, pp. 83–88, "Circuit Applications of Voltage-Sensitive Capacitors," Jenkins.

DAVID G. REDINBAUGH, *Primary Examiner.*

ROY LAKE, *Examiner.*